Patented Aug. 24, 1948

2,447,585

UNITED STATES PATENT OFFICE 2,447,585

REDUCTION OF THE ASH CONTENT OF NITROAROMATIC COMPOUNDS

Ralph Burgess Mason, Baton Rouge, La., assignor to Standard Oil Development Company, a corporation of Delaware No Drawing. Application October 7, 1943, Serial No. 505,411

5 Claims. (Cl. 260—645)

The present invention relates to improvements in the art of reducing nitroaromatics to the corresponding aromatic amines and more particularly it relates to conditioning the feed stock for such a commercial operation.

Commercial nitroxylenes stored and/or shipped in iron or steel containers usually acquire or become admixed with water. Where water is present, the commercial nitroxylenes are apt to be contaminated with aqueous solutions of metal salts, particularly iron.

For example, I examined a nitroxylene which was purchased from a manufacturer for the purpose of hydrogenating it to xylidine. It was contaminated with a colloidal aqueous suspension or solution containing iron. The suspended material in the nitroxylene proved to be a serious obstacle to the continuous operation of the unit in which the nitroxylene was charged to be converted to xylidine, due to the fact, that solid material deposited on the preheater coils and in the reactors, caused catalyst deactivation by deposition thereon and was otherwise highly objectionable.

Consequently, the nitroxylene, as purchased, was an unsatisfactory feed stock, in the state indicated, and it was necessary to treat it to remove the ash constituents, or the dissolved or suspended material.

In brief compass, my invention involves treating a commercial aromatic nitro compound which in storage or in transit has become contaminated with non-filterable iron or its compounds and/or calcium compounds or other non-filterable materials and/or with aqueous true solutions and/or colloidal suspensions of such materials, with a reagent such as calcium chloride, sodium chloride, or an anhydrous salt, whereby the finely dispersed or dissolved solid particles such as the calcium or iron salts are coagulated, and thereby rendered removable by filtration. To this end the nitro feed stock is discharged into a settling zone where it is permitted to remain in contact with a suitable electrolyte, such as calcium chloride, for a sufficient period of time to permit the solid particles to coagulate and settle by gravity, and then the treated nitroxylene is filtered. A desirable filtration medium is a bed of clay.

To illustrate my invention, 229 grams of nitroxylene purchased from a manufacturer was analyzed and found to have an ash content of 0.009 weight percent. This commercial nitroxylene was agitated for 15 minutes with 10 grams of anhydrous calcium chloride, permitted to stand and then filtered. By the treatment indicated, the ash content was reduced to 0.0009 weight percent. To show the effect of adding calcium chloride to cause coagulation and thereby facilitate filtering of the undesired material, it is pointed out that by merely filtering the untreated nitroxylene, the latter was found to contain 0.003% ash content, showing that the ash content can not be sufficiently reduced by simply filtering. Other experiments showed that the dissolved, suspended or colloidal material associated with the commercial nitroxylene would not settle out of it within any reasonable period of time.

Instead of using calcium chloride as disclosed in the foregoing specific example, I may employ any one of a number of water-soluble inorganic salts such as magnesium chloride, sodium chloride, etc. Preferably, however, the driving and/or anhydrous salts should be used. While not wishing to be bound by any theory of operation, it is my belief that the principal suspended material in the aqueous medium associated with the commercial nitroxylene was iron, in a colloidal or suspended form in which the particles of iron were enveloped in water. By causing disruption of the enveloping film of water, surrounding the particles of iron, by the addition of a drying or anhydrous salt, the colloidal solution or suspension of iron was "broken" or changed to a state in which it was free to coagulate and/or separate by gravity.

It is obvious that my improvements are not limited to the precise details enumerated hereinbefore, but obviously are applicable to any system or quantity of material having associated therewith water and iron or some other colloidal material suspended therein. That is to say, many commercial products such as nitrobenzene, nitrotoluene, as well as nitroxylene, are produced, shipped and stored under conditions such that it is virtually impossible to exclude water, and to prevent dissolution of iron in the water, either chemically or colloidally, probably by the corrosive action of the water upon the iron containers in which the nitroxylene is shipped or stored. The water in many commercial operations may not be undesirable. In the continuous catalytic reduction of nitroxylene to form xylidines, the water per se is not undesirable, but, I have found that the suspended solid material contained therein is deposited in the form of gelatinous deposits in transfer lines, heating coils, etc. Hence, it is invariably necessary, when it is not readily removed by filtration or settling, to remove these solids by additional methods. I have found that a relatively small amount of calcium chloride or its equivalent is satisfactory in causing or inducing the precipitation of the suspended material from the water.

Numerous modifications of my invention will suggest themselves to those who are familiar with this art.

What I claim is:

1. The improvement in the method of separating non-filterable ash-producing material from commercial nitroaromatics, which comprises adding to said nitroaromatics a small quantity of a solid water-soluble drying inorganic salt.

2. The method set forth in claim 1, in which the inorganic salt is anhydrous calcium chloride.

3. The method set forth in claim 1 in which the nitroaromatic compound is commercial nitroxylene.

4. The method of purifying commercial nitroaromatics containing non-filterable ash-producing material containing iron which comprises removing the ash-producing material by treatment of the nitroaromatics with a water-soluble inorganic drying salt, permitting the treated material to remain quiescent for a sufficient period of time to allow the ash-producing material to settle and thereafter removing said ash producing material by filtration.

5. In the preparation of a nitroaromatic containing non-filterable ash-producing material for use as a feed stock for a hydrogenation step for producing aromatic amines, the improvement which comprises adding a solid water-soluble inorganic drying salt to said nitroaromatic to convert the non-filterable ash-producing material to filterable material and then removing the converted ash-producing material from said nitroaromatic by filtering.

RALPH BURGESS MASON.

REFERENCES CITED

The following references are of record in the file of this patent:

UNITED STATES PATENTS

| Number | Name | Date |
| --- | --- | --- |
| 1,440,352 | Gatrell | Dec. 26, 1922 |
| 1,515,093 | Crites | Nov. 11, 1924 |
| 1,700,627 | Cole | Jan. 29, 1929 |
| 2,305,323 | Savelli | Dec. 15, 1942 |